(12) United States Patent
Baden et al.

(10) Patent No.: US 10,848,257 B2
(45) Date of Patent: Nov. 24, 2020

(54) APPARATUS AND METHOD FOR TIMESTAMPING OF DATA PACKETS

(71) Applicant: Avago Technologies International Sales Pte. Limited, Singapore (SG)

(72) Inventors: Eric Baden, Saratoga, CA (US); Ankit Bansal, San Jose, CA (US); Sharath Gargeshwari, Cupertino, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 0 days.

(21) Appl. No.: 16/580,270

(22) Filed: Sep. 24, 2019

(65) Prior Publication Data

US 2020/0021381 A1 Jan. 16, 2020

Related U.S. Application Data

(62) Division of application No. 15/150,979, filed on May 10, 2016, now Pat. No. 10,432,337.

(60) Provisional application No. 62/162,380, filed on May 15, 2015.

(51) Int. Cl.
*H04J 3/06* (2006.01)
*H04L 12/26* (2006.01)
*H04L 29/06* (2006.01)

(52) U.S. Cl.
CPC .......... *H04J 3/0697* (2013.01); *H04J 3/0661* (2013.01); *H04L 43/0852* (2013.01); *H04L 43/0894* (2013.01); *H04L 69/28* (2013.01)

(58) Field of Classification Search
CPC ....................................................... H04J 3/06
See application file for complete search history.

(56) References Cited

U.S. PATENT DOCUMENTS

| | | | | |
|---|---|---|---|---|
| 5,983,303 | A | * | 11/1999 | Sheafor ............... G06F 13/4217 365/189.04 |
| 2003/0117176 | A1 | * | 6/2003 | Tardieux ............... G06F 1/3237 326/93 |
| 2016/0337114 | A1 | | 5/2016 | Baden et al. |

* cited by examiner

*Primary Examiner* — Sulaiman Nooristany
(74) *Attorney, Agent, or Firm* — Xsensus LLP (57) ABSTRACT

An apparatus and method for timestamping data packets are provided. The apparatus includes an input bit counter responsive to input bits entering a physical layer (PHY) device and an output bit counter responsive to output bits transmitted by the PHY device. A timestamp for an incoming bit is calculated based on a number of bits awaiting transmission by the PHY device at the time of arrival of the incoming bit. The number of bits awaiting transmission by the PHY device is determined based on the first count and the second count.

19 Claims, 7 Drawing Sheets

APPARATUS AND METHOD FOR TIMESTAMPING OF DATA PACKETS

CROSS-REFERENCE TO RELATED APPLICATIONS

The present application is a divisional of U.S. patent application Ser. No. 15/150,979, filed May 10, 2016, which claims the benefit of U.S. Provisional Application No. 62/162,380, filed May 15, 2015, both of which are incorporated herein by reference in their entireties.

TECHNICAL FIELD

The present disclosure relates generally to timestamping of packets.

BACKGROUND

The IEEE 1588 Precision Time Protocol (PTP) is a standard which provides a mechanism to accurately synchronize clocks in different devices across a network, and to measure the duration of time, or residence time, a packet takes to ingress and then egress a network device. To achieve this accuracy, the IEEE 1588 standard requires hardware to measure the residence time within a device or a system. The accuracy of the residence time calculation depends on the accuracy of the packet timestamping scheme.

Conventional timestamping schemes perform timestamping in the media access control (MAC) sublayer of the data link layer. This results in inaccuracies due to latency variations in both the Physical Coding Sublayer (PCS) and the Forward Error Correction (FEC) sublayer of the physical layer (PHY) device communicating with the MAC sublayer.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
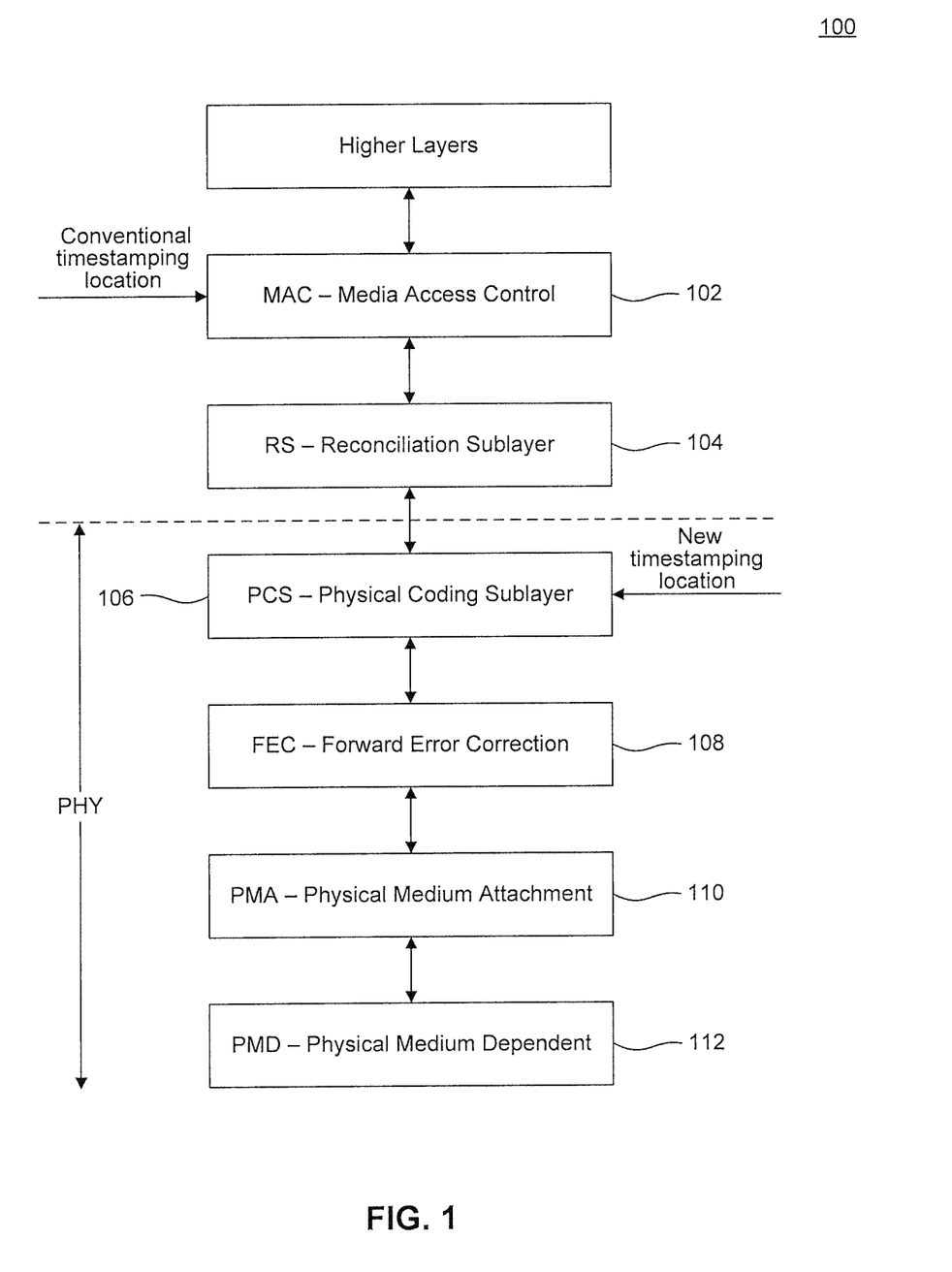
FIG. 1 illustrates an example communication protocol stack that may be implemented in a communications device.

FIG. 1 illustrates an example communication protocol stack 100 that may be implemented in a communications device. Example communication protocol stack 100 is provided for the purpose of illustration only and is not limiting of embodiments. As shown in FIG. 1, communication protocol stack 100 includes a Media Access Control (MAC) sublayer 102, a Reconciliation Sublayer (RS) 104, a Physical Coding Sublayer (PCS) 106, a Forward Error Correction (FEC) sublayer 108, a Physical Medium Attachment (PMA) sublayer 110, and a Physical Medium Dependent (PMD) sublayer 112. Communication protocol stack 100 may also include higher layers that sit above MAC sublayer 102. Generally, PCS 106, FEC sublayer 108, PMA sublayer 110, and PMD sublayer 112 form a physical layer (PHY) that can be implemented within a PHY device. Conventional functions performed by the different layers/sublayers shown in FIG. 1 are well known to a person of skill in the art and are not described herein. Further, the various sublayers described herein can be implemented using one or more logic circuits and/or processors, and will be understood by one skilled in the art based on the description and functionality described herein.

As illustrated in FIG. 1, conventional timestamping schemes perform timestamping in MAC sublayer 102. Generally, these schemes assume a fixed bit latency through the physical layer. However, in practice, latency through the physical layer can be highly variable. For example, latency variations can be large in PCS 106 and FEC sublayer 108. In PCS 106, the latency variations are generally due to PCS functions such as alignment marker (AM) insertion, idle deletion, and clock compensation. Data compression and parity bit addition are main contributors of latency variations in FEC sublayer 108.

Because of the variability of the physical layer latency, timestamping at MAC sublayer 102 may not provide the desired accuracy for applications requiring a high level of time synchronization, for example. Further, in the case of a multi-lane communications device (i.e., a communications device with multiple transmit/receive lanes in the physical layer), skew may be present between the multiple lanes. By assuming a fixed physical layer latency, timestamping at MAC sublayer 102 does not distinguish between the multiple lanes and therefore cannot compensate for skew differences. Additional timestamping inaccuracies may thus be introduced by timestamping at MAC sublayer 102.

Embodiments of the present disclosure, as illustrated in FIG. 1, perform timestamping in PCS 106 of the physical layer, instead of MAC sublayer 102. As further discussed below, in an embodiment, instantaneous latency through the physical layer is dynamically tracked. An outgoing bit arriving at PCS 106 is timestamped in PCS 106 based on the instantaneous latency through the physical layer. As such, highly accurate timestamping can be achieved.

In the receive direction, in an embodiment, incoming data is timestamped after PMD sublayer 112. The arrival time of a first bit of a data packet (at a physical medium connected to PMD sublayer 112) can be derived based on the timestamping at PMD sublayer 112 and a known latency required by PMD sublayer 112 to receive a bit from the physical medium.

Figure 2:
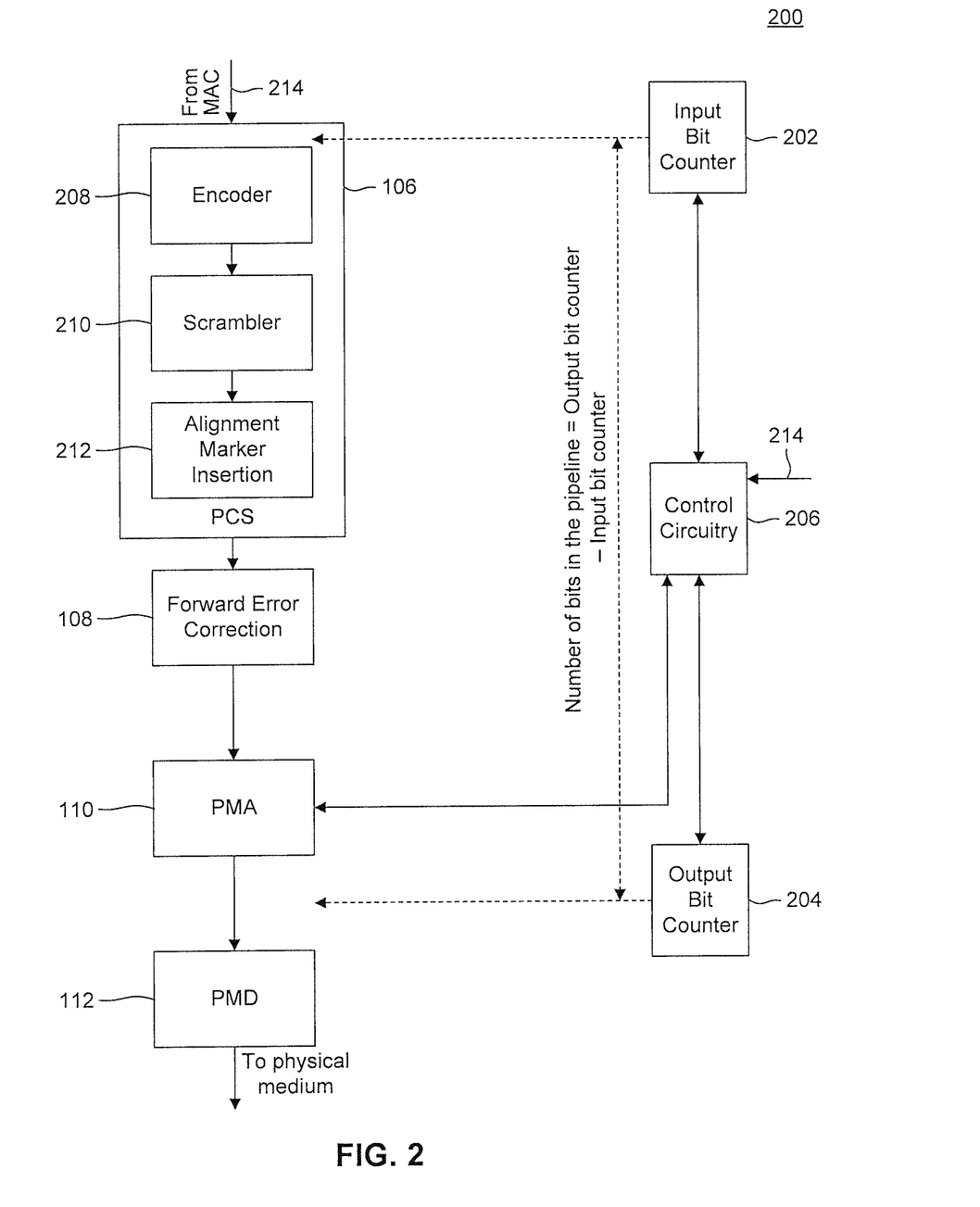
FIG. 2 illustrates an example physical layer (PHY) device having a transmission timestamping scheme according to an embodiment.

FIG. 2 illustrates an example PHY device 200 having a transmission timestamping scheme according to an embodiment. Example PHY device 200 is provided for the purpose of illustration only and is not limiting of embodiments. As shown in FIG. 2, example PHY device 200 implements a PHY layer, including a PCS 106, an FEC sublayer 108, a PMA sublayer 110, and a PMD sublayer 112. PCS 106 includes an encoder 208, a scrambler 210, and an AM insertion logic 212. PHY device 200 includes an input bit counter 202, an output bit counter 204, and control circuitry 206. Control circuitry 206 can be implemented using one or more processors and/or logic circuits as will be understood by those skilled in art based on the discussion provided herein.

In the transmit direction, PHY device 200 receives an input bit stream 214 from an overlying MAC sublayer via PCS 106. PHY device 200 transmits the data represented by input bit stream 214 onto a physical medium attached to PMD sublayer 112.

In an embodiment, input bit counter 202 is configured to maintain a first count responsive to input bits received by PHY device 200 from the MAC sublayer via input bit stream 214. Specifically, input bit counter 202 counts the number of bits entering PHY device 200 for transmission onto the physical medium. Input bit counter 202 may increment the first count at the control of control circuitry 206. In an embodiment, control circuitry 206 receives a version of input bit stream 214 and controls input bit counter 202 to increment the first count responsive to input bit stream 214.

Input bit counter 202 may increment the first count on a bit by bit basis, so that each bit received of the input bit stream 214 increments the first count. In another embodiment, input bit counter 202 is updated on a data block basis. The data block may be 64 bits, for example. Specifically, for every data block in input bit stream 214, control circuitry 206 controls input bit counter 202 to increment the first count by a pre-defined number of bits contained in the data block.

In another embodiment, control circuitry 206 further accounts for expected bit additions to, or deletions from, the data block due to processing of the data block in PHY device 200. In an embodiment, control circuitry 206 determines a number of line encoding bits added to the data block by encoder 208, a number of AM insertion bits added to the data block by AM insertion logic 212, a number of bits removed by compression of the data block by FEC sublayer 108, and a number of FEC parity bits added to the data block by FEC sublayer 108. The first count is accordingly incremented by the pre-defined number of bits contained in the data block adjusted by a net number of bits due to additions/deletions from the data block due to PHY processing (hereinafter referred to as overhead bits). In an embodiment, control circuitry 206 calculates the number of overhead bits based on the pre-defined number of bits contained in the data block (without needing to wait for actual processing of the data block by PHY device 200).

In an embodiment, output bit counter 204 is configured to maintain a second count responsive to output bits transmitted by PHY device 200 onto the physical medium. In an embodiment, the second count tracks the number of bits output by PMA sublayer 110 to PMD sublayer 112. Output bit counter 204 may increment the second count on a bit by bit basis or per a group of bits.

Output bit counter 204 may increment the second count at the control of control circuitry 206. In an embodiment, control circuitry 206 is in communication with PMA sublayer 110 to track the number of bits output by PMA sublayer 110 to PMD sublayer 112. Control circuitry 206 controls output bit counter 204 to increment the second count responsive to the number of bits output by PMA sublayer 110 to PMD sublayer 112.

Control circuitry 206 is configured to timestamp data packets contained in input bit stream 214 received by PHY device 200. In an embodiment, as input bit stream 214 is received by PCS 106 of PHY device 200, control circuitry 206 identifies bits of input bit stream 214 that correspond to start of packet (SOP) bits (an SOP bit is the first bit of a data packet). Upon receipt of an SOP bit by PCS 106, control circuitry 206 determines a number of bits awaiting transmission by PHY device 200 onto the physical medium. The bits awaiting PHY transmission at the time of receipt of the SOP bit represent the bits that must be transmitted by PHY device 200 before the SOP bit can be transmitted. As such, the number of bits awaiting PHY transmission at the time of receipt of the SOP bit determine the transmission time of the SOP bit onto the physical medium.

In an embodiment, control circuitry 206 determines the number of bits awaiting transmission by PHY device 200, at the time of receipt of the SOP bit, based on the first count and the second count. In an embodiment, control circuitry 206 reads the first count from input bit counter 202 and the second count from output bit counter 204 at the same time instant. Control circuitry 206 then subtracts the second count from the first count to determine the number of bits awaiting transmission by PHY device 200, at the time of receipt of the SOP bit.

In an embodiment, to generate the difference between the first count and the second count, the first and second count information must be made available in the same clock domain. When input bit counter 202 and output bit counter 204 are in the same clock domain, the first count and the second count are generated in the same clock domain, and thus their difference can be readily taken. However, when input bit counter 202 and output bit counter 204 are in different clock domains, the first count and the second count must first be transferred to the same clock domain in order to calculate their difference. To do that, the first count, the second count, or both may need to be transferred to another clock domain. For example, the first count may be transferred to a first clock domain of output bit counter 204 and the difference is computed in the first domain, or the second count may be transferred to a second clock domain of input bit counter 202 and the difference is computed in the second clock domain. Alternatively, both the first count and the second count may be transferred to a third clock domain where the difference is computed. Timing errors are introduced when information is transferred across clock domains, which may affect the difference between the first count and the second count. In an embodiment, to account for such timing errors, control circuitry 206 is configured to compute a cross-domain transfer time error associated with transferring the first count, the second count, or both to another clock domain for the purpose of computing their difference. Control circuitry 206 accounts for the computed cross-domain transfer time error in computing the difference between the first count and the second count.

Assuming a constant and pre-determined bit transmission rate of PHY device 200, control circuitry 206 calculates a timestamp for the data packet (corresponding to the received SOP bit) based on the determined number of bits awaiting PHY transmission and the pre-determined bit transmission rate of PHY device 200.

In an embodiment, control circuitry 206 divides the determined number of bits by the pre-determined bit transmission rate of PHY device 200 to determine a PHY latency for the SOP bit. Control circuitry 206 then adds the determined PHY latency to a current clock time, at the time of receipt of the SOP bit, to determine the timestamp for the data packet. For example, assuming that PHY device 200 has a 1 Gbps constant bit transmission rate and that 1000 bits await PHY transmission at the time of receipt of the SOP bit, the PHY latency for the SOP bit will be equal to 1000/1,000,000,000=0.000001 second or 1 microsecond. The timestamp for the data packet will be equal to the current clock time, at the time of receipt of the SOP bit, plus 1 microsecond.

As such, the timestamp for the data packet represents the exact time of transmission of the SOP bit by PHY device 200 onto the physical medium. In an embodiment, control circuitry 206 inserts the timestamp into a timestamp field of the data packet. In an embodiment, control circuit 206 acts on input bit stream 214 before it is input into encoder 208 to insert the timestamp.

Figure 3:
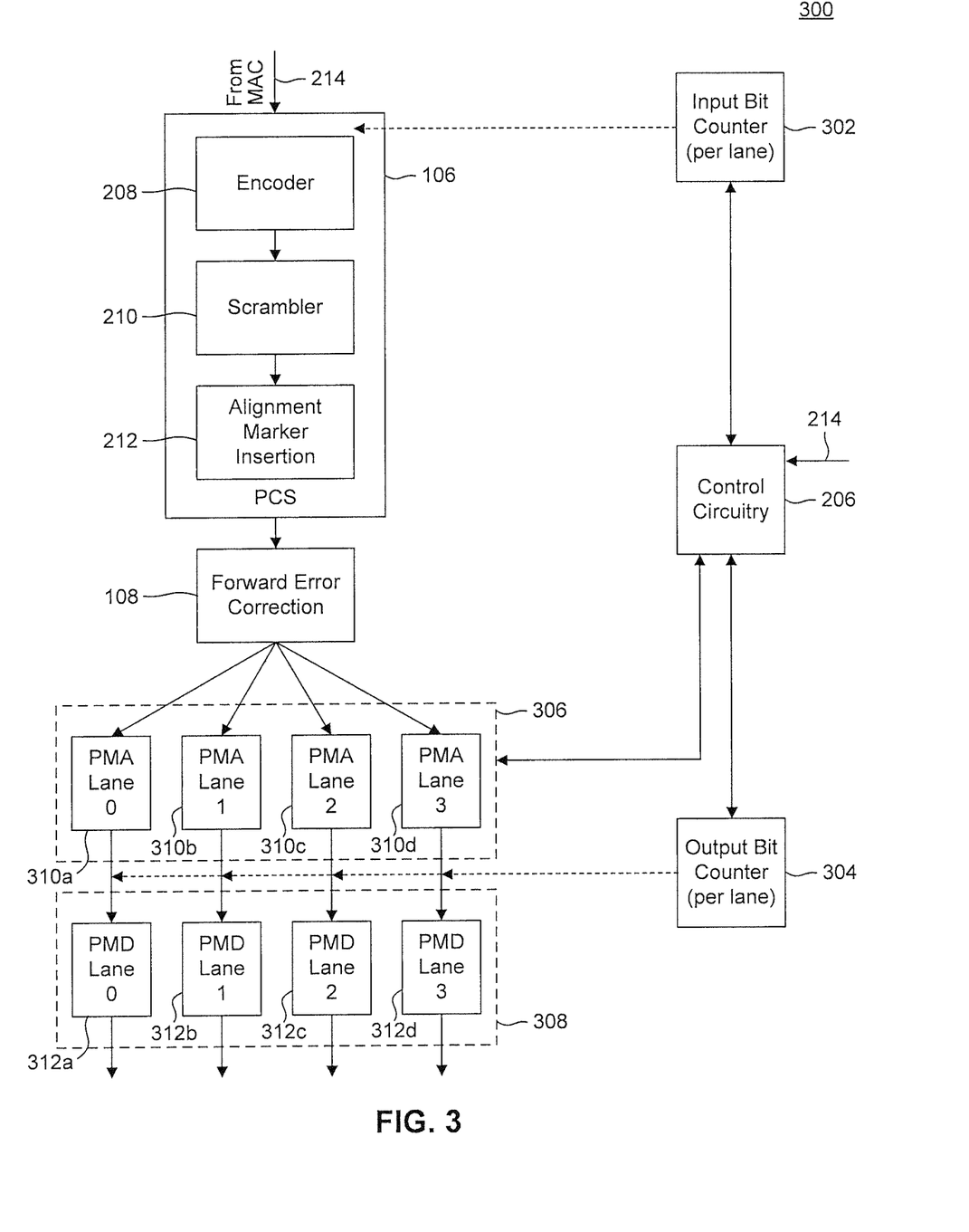
FIG. 3 illustrates another example PHY device having a transmission timestamping scheme according to an embodiment.

FIG. 3 illustrates another example PHY device 300 having a transmission timestamping scheme according to an embodiment. Example PHY device 300 is provided for the purpose of illustration only and is not limiting of embodiments. As shown in FIG. 3, example PHY device 300 implements a PHY layer, including PCS 106, FEC sublayer 108, a PMA sublayer 306, and a PMD sublayer 308. PCS 106 includes encoder 208, scrambler 210, and AM insertion logic 212. In addition to implementing the PHY layer, PHY device 300 includes an input bit counter 302, an output bit counter 304, and control circuitry 206.

PHY device 300 implements multiple PHY transmission lanes. As such, PMA sublayer 306 includes a plurality of PMA lanes 310*a*-*d*, and PMD sublayer 308 includes a plurality of PMD lanes 312*a*-*d*. As would be understood by a person of skill in the art based on the teachings herein, embodiments are not limited to having four PMA/PMD lanes as shown in FIG. 3, and more or less than four lanes may be used.

In the transmit direction, PHY device 300 receives input bit stream 214 from an overlying MAC sublayer via PCS 106. PHY device 300 transmits the data represented by input bit stream 214 onto a physical medium attached to PMD sublayer 308.

In an embodiment, as input bit stream 214 is received from the MAC sublayer, control circuitry 206 determines on a data block basis the PHY transmission lane on which the data block is to be transmitted by PHY device 300. For example, control circuitry 206 may use a round robin scheme to assign data blocks contained in input bit stream 214 to the plurality of PHY transmission lanes.

Input bit counter 302 implements a separate per lane input bit counter for each of the plurality of PHY transmission lanes of PHY device 300. In an embodiment, when control circuitry 206 assigns a data block to a particular PHY transmission lane (e.g., PMA lane 310*a* and PMD lane 312*a*), control circuitry 206 controls input bit counter 302 to increment the lane input bit counter corresponding to the selected PHY transmission lane. In an embodiment, the lane input bit counter is incremented responsive to a data block in a similar fashion as described above with respect to input bit counter 202 described above with reference to FIG. 2.

In an embodiment, control circuitry 206 is configured to timestamp data packets contained in input bit stream 214 received by PHY device 300. In an embodiment, as input bit stream 214 is received by PCS 106, control circuitry 206 identifies bits of input bit stream 214 that correspond to SOP bits. Upon receipt of an SOP bit by PCS 106, control circuitry 206 determines a number of bits awaiting transmission by the PHY transmission lane on which the SOP bit will be transmitted. For example, control circuitry 206 may identify a data block in input bit stream 214 and assign the identified data block to a first PHY transmission lane provided by PMA lane 310*a* and PMD lane 312*a*. In subsequent processing, control circuitry 206 may determine that the first bit of the data block corresponds to an SOP bit. Control circuitry 206 thus determines that a data packet timestamp must be determined on the basis of the first bit of the identified data block, based on the delay of the first PHY transmission lane provided by PMA lane 310*a* and PMD lane 312*a*.

In an embodiment, output bit counter 304 implements a separate per lane output bit counter for each of the plurality of PHY transmission lanes of PHY device 300. A lane output bit counter is similar to output bit counter 204 described with reference to FIG. 2 above, except that the lane output bit counter counts the number of output bits transmitted by its respective PHY transmission lane onto the physical medium. In an embodiment, the lane output bit counter tracks the number of bits output by the lane PMA sublayer to the lane PMD sublayer. Like output bit counter 204, the lane output bit counter may be incremented on a bit by bit basis or per a group of bits. In an embodiment, the lane output bit counters are incremented at the control of control circuitry 206. In another embodiment, control circuitry 206 is in communication with PMA lanes 310*a*-*d* to track the respective number of bits output by PMA lanes 310*a*-*d* to PMD lanes 312*a*-*d* respectively. Control circuitry 206 controls the lane output bit counters responsive to the respective number of bits output by PMA lanes 310*a*-*d* to PMD lanes 312*a*-*d*.

In an embodiment, at the time of receipt of an SOP bit, control circuitry 206 determines the number of bits awaiting transmission by the PHY transmission lane on which the SOP bit will be transmitted, based on a first count and a second count retrieved from the respective lane input bit counter and output bit counter. For example, assuming that the SOP bit will be transmitted by a first PHY transmission lane provided by PMA lane 310*a* and PMD lane 312*a*, control circuitry 206 reads the first count from a lane input bit counter of input bit counter 302 corresponding to the first PHY transmission lane, and reads the second count from a lane output bit counter of output bit counter 304 corresponding to the first PHY transmission lane. The lane input bit counter and output bit counter are read at the same time instant. Control circuitry 206 then subtracts the second count from the first count to determine the number of bits awaiting transmission by the first PHY transmission lane, at the time of receipt of the SOP bit.

Assuming a constant and pre-determined bit transmission rate of the selected PHY transmission lane, control circuitry 206 calculates a timestamp for the data packet (corresponding to the received SOP bit) based on the determined number of bits awaiting PHY transmission by the selected PHY transmission lane and the pre-determined bit transmission rate of the selected PHY transmission lane. In an embodiment, the bit transmission rate of a PHY transmission lane is equal to the bit transmission rate of PHY device 300 divided by the number of active PHY transmission lanes. In another embodiment, the bit transmission rate of the PHY transmission lane is pre-configured without regard to the number of active PHY transmission lanes.

In an embodiment, control circuitry 206 divides the determined number of bits by the pre-determined bit transmission rate of the selected PHY transmission lane to determine a PHY latency for the SOP bit. Control circuitry 206 then adds the determined PHY latency to a current clock time, at the time of receipt of the SOP bit, to determine the timestamp for the data packet. The timestamp for the data packet represents the exact time of transmission of the SOP bit by the selected PHY transmission lane or PHY device 300 onto the physical medium. In an embodiment, control circuitry 206 inserts the timestamp into a timestamp field of the data packet.

Figure 4:
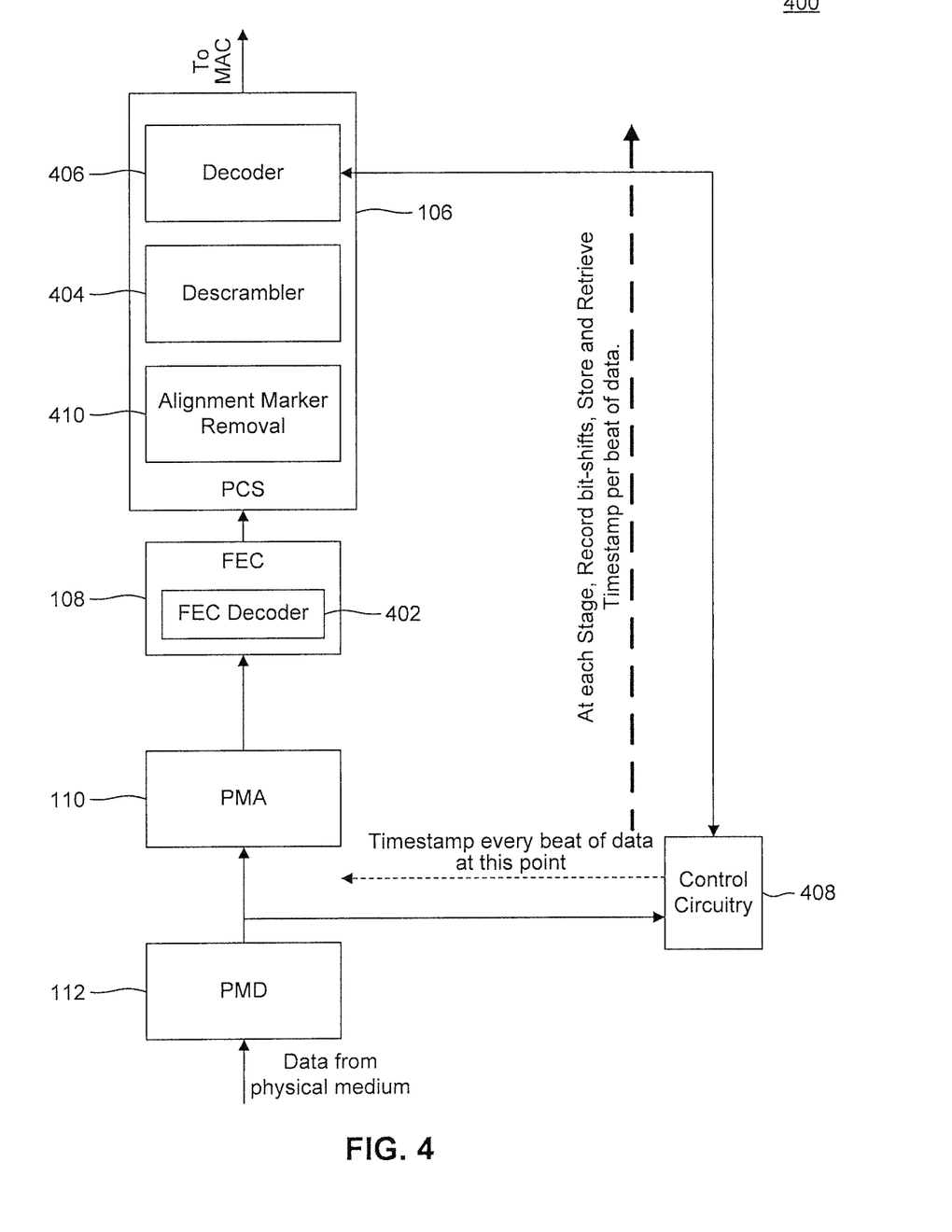
FIG. 4 illustrates an example PHY device having a receive timestamping scheme according to an embodiment.

FIG. 4 illustrates an example PHY device 400 having a receive timestamping scheme according to an embodiment.

Example PHY device 400 is provided for the purpose of illustration only and is not limiting of embodiments. As shown in FIG. 4, PHY device 400 may implement a PHY layer, including PCS 106, FEC sublayer 108, PMA sublayer 110, and PMD sublayer 112. PCS 106 includes a descrambler 404, a decoder 406, and alignment marker (AM) removal logic 410. FEC sublayer 108 includes an FEC decoder 402. In addition to implementing the PHY layer, PHY device 400 includes control circuitry 408.

PHY device 400 receives data from a physical medium via an input port of PMD sublayer 112 that is attached to the physical medium. The received data is produced at an output port of PMD sublayer 112, which serves as an interface between PMD sublayer 112 and PMA sublayer 110. In an embodiment, control circuitry 408 is coupled to the interface between PMD sublayer 112 and PMA sublayer 110. In another embodiment, control circuitry 408 may be coupled to PMD sublayer 112 and/or PMA sublayer 110.

In an embodiment, control circuitry 408 is configured to timestamp every beat of data generated at the output port of PMD sublayer 112. In embodiments, a beat of data is a group of bits whose size can be configured depending on implementation. In an embodiment, control circuitry 408 timestamps the first bit of every beat of data, upon generation of the first bit at the output port of PMD sublayer 112. The timestamp can be calculated by subtracting a fixed bit latency, corresponding to the time required for the first bit to be received by PMD sublayer 112 from the physical medium, from a current clock time at which the first bit is recognized.

In another embodiment, control circuitry 408 is further configured to determine whether the timestamped beat of data includes a first bit of a data packet (SOP bit). If an SOP bit is contained in the timestamped beat of data, then control circuitry 408 is configured to derive a timestamp for the SOP bit from the timestamp of the beat of data. This derive timestamp represents the time that the SOP bit was received by PHY device 400 and is a receive timestamp for the data packet. In an embodiment, control circuitry 408 determines a bit shift of the SOP bit from the first bit of the beat of data, and calculates the timestamp for the SOP bit based on the timestamp of the beat of data and the determined bit shift.

In an embodiment, the data packet is comprised of a series of data blocks. A data block may be 66 bits long for example. To determine whether a timestamped beat of data includes an SOP bit, in an embodiment, control circuitry 408 first determines whether a data block boundary bit (first bit of a data block) occurs within the beat of data. For example, a beat of data may be 40 bits long. As such, where the data block is 66 bits long, a beat of data may or may not include a data block boundary bit. In an embodiment, a data block boundary bit can be identified from a known bit sequence used at the start or end of a data block. In an embodiment, data block boundaries may only be identified after the data has reached decoder 406, which retrieves the original data blocks that were line encoded, scrambled, and FEC encoded at the transmit side. If a data block boundary bit occurs within the beat of data, control circuitry 408 then determines whether the boundary bit corresponds to an SOP bit.

In an embodiment, when the beat of data includes a boundary bit of a data block, control circuitry 408 is configured to determine a timestamp for the boundary bit based on the timestamp of the beat of data and a bit location of the boundary bit within the beat of data. For example, the boundary bit may be the $10^{th}$ bit in the beat of data. As such, the boundary bit timestamp will be equal to the timestamp of the beat of data, plus the PMD receive latency of the 8 bits that precede the boundary bit in the beat of data after the first bit of the beat of data.

In an embodiment, after timestamping an identified boundary bit of a data block, control circuitry 408 is further configured to determine whether the data block corresponds to a first data block of a data packet, or otherwise whether the boundary bit corresponds to an SOP bit. An SOP bit can be identified from a known bit sequence used at the start of a data packet. In an embodiment, if the boundary bit corresponds to an SOP bit, control circuitry 408 is configured to set the bit shift of the SOP bit as equal to the bit location of the boundary bit within the beat of data. The timestamp for the SOP bit can then be calculated as the sum of the timestamp of the beat of data and the PMD receive latency of the preceding bits within the beat of data, minus the PMD receive latency of the boundary bit or SOP bit itself.

Figure 5:
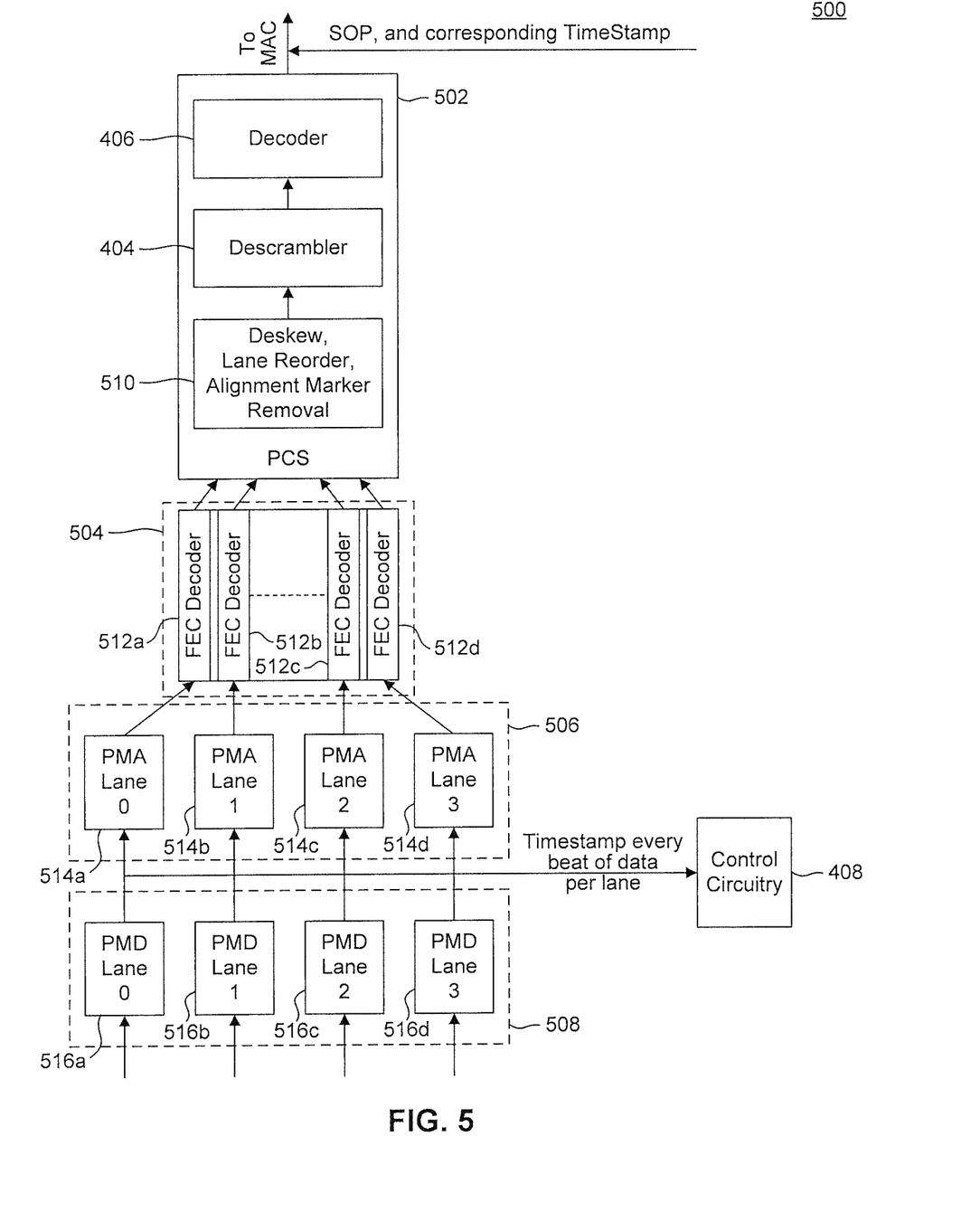
FIG. 5 illustrates another example PHY device having a receive timestamping scheme according to an embodiment.

FIG. 5 illustrates another example PHY device 500 having a receive timestamping scheme according to an embodiment. Example PHY device 500 is provided for the purpose of illustration only and is not limiting of embodiments. As shown in FIG. 5, PHY device 500 may implement a PHY layer, include a PCS 502, an FEC sublayer 504, a PMA sublayer 506, and a PMD sublayer 508. In addition to implementing the PHY layer, PHY device 500 includes control circuitry 408.

PHY device 500 implements multiple PHY receive lanes. As such, in an embodiment, FEC sublayer 504 includes a plurality of FEC decoder lanes 512a-d, PMA sublayer 506 includes a plurality of PMA lanes 514a-d, and PMD sublayer 508 includes a plurality of PMD lanes 516a-d. As would be understood by a person of skill in the art based on the teachings herein, embodiments are not limited to having four FEC/PMA/PMD lanes as shown in FIG. 5, and more or less than four lanes may be used.

PCS 502 includes descrambler 404 and decoder 406 like PCS 106 described in FIG. 4, but further includes a lane deskew/reorder and AM removal logic 510. In addition to performing AM removal, logic 510 is configured to reduce or eliminate the effects of skew between the different PHY receive lanes provided by PMA lanes 514a-d and PMD lanes 516a-d. In an embodiment, logic 510 is configured to detect an alignment marker in each of the incoming data streams corresponding to the plurality of PHY receive lanes provided by PMA lanes 514a-d and PMD lanes 516a-d. In an embodiment, the alignment marker is a 66 bit sequence that is unique per lane. Logic 510 uses the detected alignment markers to determine an order in which the plurality of PHY receive lanes are processed. In other words, logic 510 uses the alignment markers to serialize the parallel streams represented by the plurality of data streams corresponding to the plurality of PHY receive lanes. In another embodiment, the alignment marker has the same value for each lane. To reorder the incoming data streams, logic 510 relies on reorder information that is provided separately by the transmitter.

In an embodiment, lane deskew/reorder logic 510 is configured to determine receive latency differences between the different PHY receive lanes and to adjust generated timestamps and/or processing order accordingly. By adjusting the timestamps, in an embodiment, the order in which the outputs of FEC decoder lanes 512a-d are processed by PCS 502 may be adjusted. Operation of PHY device 500 is otherwise similar to that of PHY device 400 described above, except that receive timestamping, SOP identification, and SOP timestamp determination are performed on a per lane basis. The same operation described above with respect to PHY device 400 can thus be applied to each individual PHY receive lane in PHY device 500.

Figure 6:
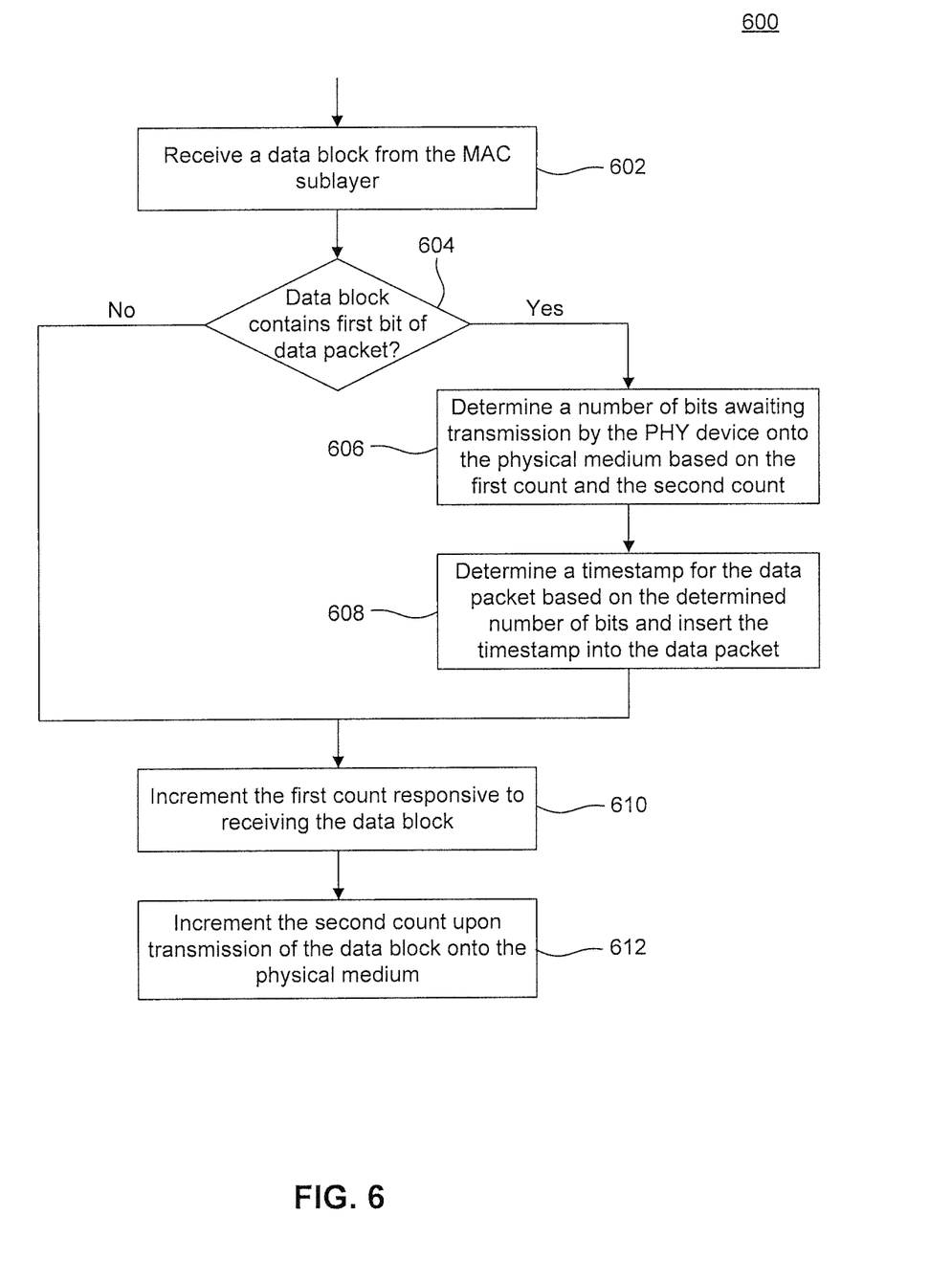
FIG. 6 illustrates an example process according to an embodiment.

FIG. 6 illustrates an example process 600 according to an embodiment. Example process 600 is provided for the purpose of illustration only and is not limiting of embodiments. In an embodiment, process 600 may be performed by a PHY device, such as PHY device 200 or 300, for example. The PHY device includes an input bit counter that maintains a first count of input bits entering the PHY device as well as overhead bits generated by the PHY device, and an output bit counter that maintains a second count of output bits transmitted by the PHY device onto a physical medium. The PHY device receives data blocks from a MAC sublayer for transmission onto the physical medium.

As shown in FIG. 6, process 600 begins in step 602, which includes receiving a data block from the MAC sublayer. In an embodiment, step 602 is performed by a PCS sublayer of a PHY layer implemented within the PHY device.

Next, step 604 includes determining whether the data block contains a first bit of a data packet (SOP bit). If the data block does not contains a SOP bit, process 600 proceeds to step 610 described further below. Otherwise, process 600 proceeds to step 606.

Step 606 includes determining a number of bits awaiting transmission by the PHY device onto the physical medium based on the first count and the second count. In an embodiment, step 606 includes subtracting the second count from the first count.

Subsequently, step 608 includes determining a timestamp for the data packet based on the number of bits determined in step 606 and inserting the timestamp in the data packet. In an embodiment, step 608 includes dividing the determined number of bits by a pre-determined bit transmission rate of the PHY device to determine a PHY latency for the first bit of the data packet, and adding the determined PHY latency to a current clock time to calculate the timestamp for the data packet. As such, the timestamp represents the time of transmission of the first bit of the data packet by the PHY device onto the physical medium.

Process 600 then proceeds to step 610, includes incrementing the first count responsive to receiving the first data block. In an embodiment, the first count is incremented by the input bit counter at the control of control circuitry, which calculates the number of bits that will need to be transmitted by the PHY device as a result of the data block. In an embodiment, the number of bits that will need to be transmitted is calculated based on a pre-defined number of bits contained in the data block and a number of overhead bits based on the pre-defined number of bits contained in the data block. The overhead bits results from bit additions to and deletions from the data block as a result of processing in the PHY device. In an embodiment, the number of overhead bits reflects line encoding bits added to the data block, AM insertion bits added to the data block bits removed by compression of the data block, and FEC parity bits added to the data block.

Process 600 terminates in step 612, which includes incrementing the second count upon transmission of the data block onto the physical medium. In an embodiment, step 612 includes incrementing the second count on a bit by bit basis (as each bit is transmitted) or per a group of bits (each time that a group of bits is transmitted).

Figure 7:
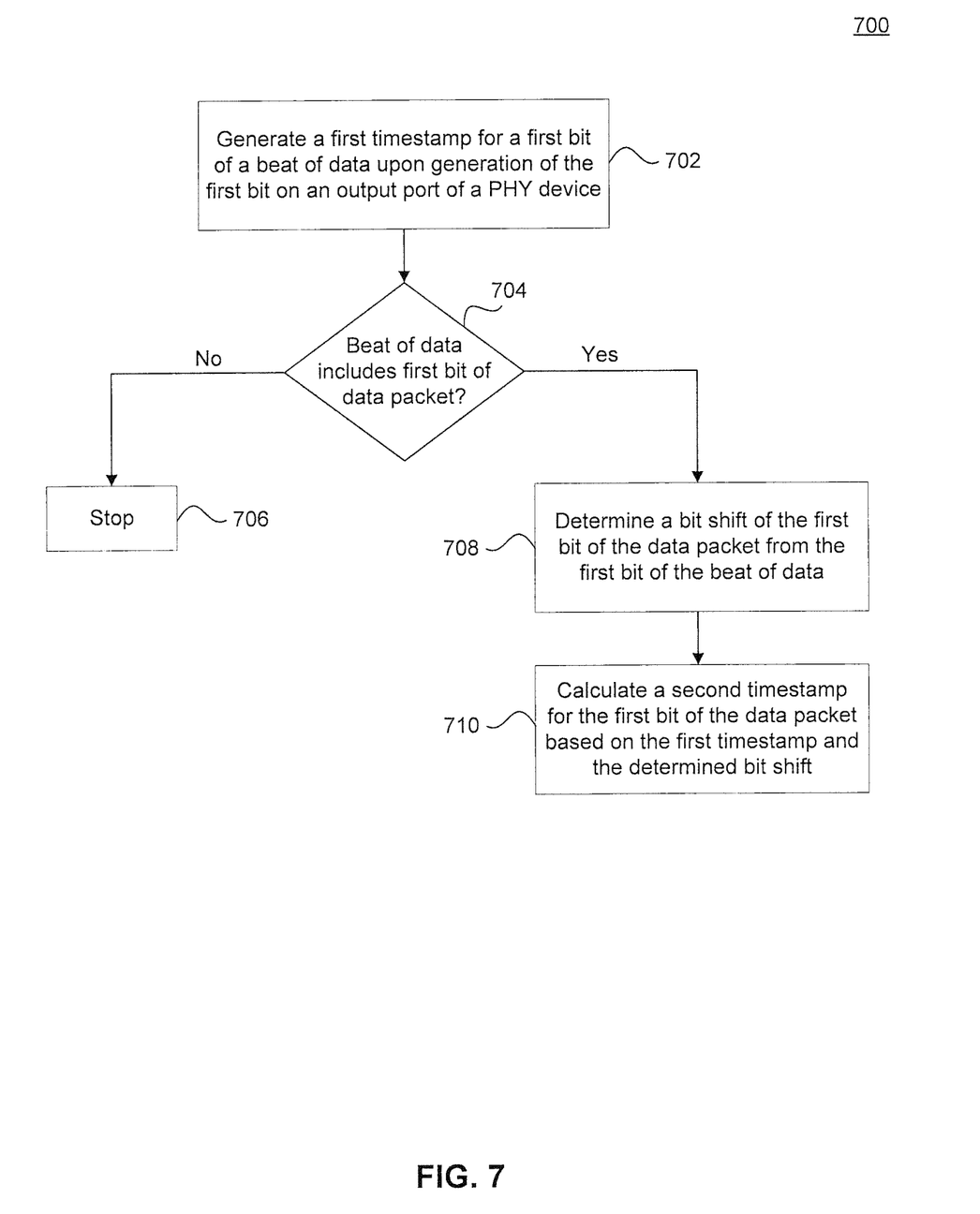
FIG. 7 illustrates another example process according to an embodiment.

FIG. 7 illustrates an example process 700 according to an embodiment. Example process 700 is provided for the purpose of illustration only and is not limiting of embodiments. In an embodiment, process 700 may be performed by a communications device having a PHY device, such as PHY device 400 or 500. The PHY device includes an input port, configured to receive data from a physical medium, and an output port that provides the received data to higher layers. The input port and the output port may correspond to an input port and an output port of a PMD sublayer, for example, of the PHY device.

As shown in FIG. 7, process 700 begins in step 702, which includes generating a first timestamp for a first bit of a beat of data upon generation of the first bit on the output port of the PHY device. In embodiments, a beat of data is a group of bits whose size can be configured depending on implementation.

Next, step 704 includes determining whether the beat of data includes a first bit of a data packet. In an embodiment, step 704 includes determining whether the beat of data includes a boundary bit of a data block. The data block may be 64 bits, for example. If the beat of data includes a boundary bit of a data block, step 704 further includes determining whether the data block corresponds to a first data block of the data packet. If so, then the boundary bit corresponds to the first bit of the data packet. In an embodiment, step 704 may further include determining a timestamp for the boundary bit based on the first timestamp and a bit location of the boundary bit within the beat of data.

If the answer to step 704 is no, process 700 proceeds to step 706 where it terminates. Otherwise, process 700 transitions to step 708, which includes determining a bit shift of the first bit of the data packet from the first bit of the beat of data. In an embodiment, step 708 includes setting the bit shift of the first bit of the data packet as equal to the bit location of the boundary bit within the beat of data.

Process 700 terminates in step 710, which includes calculating a second timestamp for the first bit of the data packet based on the first timestamp and the determined bit shift.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure.

Embodiments of the disclosure may be implemented in hardware (e.g. circuits including logic circuits), firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and other hardware media. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A communications device, comprising:
a physical layer (PHY) device having an input port and an output port, the input port configured to receive data from a physical medium; and
control circuitry configured to:
generate a first timestamp for a first bit of a beat of data upon generation of the first bit by the PHY device on the output port of the PHY device; and
determine that the beat of data includes a first bit of a data packet, wherein the first bit of the data packet is offset from the first bit of the beat of data;
determine a bit shift of the first bit of the data packet relative to the first bit of the beat of data;
calculate a second timestamp for the first bit of the data packet based on the first timestamp and the determined bit shift, wherein the second time stamp indicates a time of reception of the first bit of the data packet by a physical medium dependent (PMD) sublayer of the PHY device; and
forward the second time stamp and the data packet to one or more layers of the communications device that is above the PHY layer.

2. The communications device of claim 1, wherein the control circuitry is further configured to determine the bit shift as the bit location of the first bit of the data packet relative to the first bit of the beat of data.

3. The communications device of claim 2, wherein the control circuitry is further configured to calculate a first latency required to receive, by the PMD sublayer, bits preceding the first bit of the data packet within the beat of data based on the bit location of the first bit of the data packet within the beat of data and a predetermined receive latency of the PMD sublayer.

4. The communications device of claim 3, wherein the control circuitry is further configured to calculate a second latency required to receive, by the PMD sublayer, the first bit of the data packet based on the predetermined receive latency of the PMD sublayer.

5. The communications device of claim 4, wherein the control circuitry is further configured to calculate sum the first time stamp and the first latency and subtract the second latency to determine the second time stamp.

6. The communications device of 1, wherein the PHY devices includes multiple data receive lanes having corresponding PMD sublayers, and wherein the control circuitry is further configured to determine time stamps that indicate a time of reception of first bits of corresponding data packets received by each of the PMD sublayers of the PHY device.

7. A method of processing data packets, comprising:
receiving, by a physical layer (PHY) device, data from a physical medium;
generating a first timestamp for a first bit of a beat of data upon generation of the first bit by the PHY device on an output port of the PHY device; and
determining that the beat of data includes a first bit of a data packet, wherein the first bit of the data packet is offset from the first bit of the beat of data;
determining a bit shift of the first bit of the data packet relative to the first bit of the beat of data;
calculating a second timestamp for the first bit of the data packet based on the first timestamp and the determined bit shift; and
forwarding the second time stamp and the data packet to one or more layers of a communications device that are above the PHY layer.

8. The method of claim 7, wherein the second time stamp indicates a time of reception of the first bit of the data packet by a physical medium dependent (PMD) sublayer of the PHY device.

9. The method of claim 8, wherein the bit shift is determined as the bit location of the first bit of the data packet relative to the first bit of the beat of data.

10. The method of claim 9, further comprising calculating a first latency required to receive, by the PMD sublayer, bits preceding the first bit of the data packet within the beat of data based on the bit location of the first bit of the data packet within the beat of data and a predetermined receive latency of the PMD sublayer.

11. The method of claim 10, further comprising calculating a second latency required to receive, by the PMD sublayer, the first bit of the data packet based on the predetermined receive latency of the PMD sublayer.

12. The method of claim 11, wherein the calculating the second time stamp includes:
summing the first time stamp and the first latency and subtracting the second latency.

13. A communications device, comprising:
a physical layer (PHY) device having an input port and an output port, the input port configured to receive data from a physical medium; and control circuitry configured to:
generate a first timestamp for a first bit of a beat of data upon generation of the first bit by the PHY device on the output port; and
when the beat of data includes a first bit of a data packet, determine a bit shift of the first bit of the data packet from the first bit of the beat of data; and
calculate a second timestamp for the first bit of the data packet based on the first timestamp and the determined bit shift;
wherein the control circuitry is further configured to forward the second time stamp and the data packet to one or more layers that are above the PHY layer.

14. The communications device of claim 13, wherein the control circuitry is further configured to:
determine whether the beat of data includes a boundary bit of a data block; and
when the beat of data includes the boundary bit of the data block, determine a third timestamp for the boundary bit based on the first timestamp and a bit location of the boundary bit within the beat of data.

15. The communications device of claim 14, wherein the control circuitry is further configured to:
  determine whether the data block corresponds to a first data block of the data packet; and
  when the data block corresponds to the first data block of the data packet, set the bit shift of the first bit of the data packet as equal to the bit location of the boundary bit within the beat of data.

16. The communications device of claim 15, wherein the control circuitry is further configured to calculate a first latency required to receive, by the PHY device, bits preceding the boundary bit within the beat of data based on the bit location of the boundary bit within the beat of data.

17. The communications device of claim 16, wherein the control circuitry is further configured to calculate a second latency required to receive, by the PHY device, the boundary bit based on a pre-determined bit receive rate of the PHY device.

18. The communications device of claim 17, wherein the control circuitry is further configured to calculate the second timestamp for the first bit of the data packet as a sum of the first timestamp and the first latency, minus the second latency.

19. The method of claim 13, wherein the second time stamp indicates a time of reception of the first bit of data by a physical medium dependent (PMD) sublayer of the PHY device.

* * * * *